United States Patent [19]

Ueberdiek et al.

[11] Patent Number: 5,523,381
[45] Date of Patent: Jun. 4, 1996

[54] PRODUCTION OF POLYESTERS OF IMPROVED WHITENESS

[75] Inventors: Ralf Ueberdiek, Bobingen; Eckhard Hüsing, Obermeitingen, both of Germany

[73] Assignee: Hoechst AG, Germany

[21] Appl. No.: 290,591

[22] Filed: Aug. 15, 1994

[30] Foreign Application Priority Data

Aug. 17, 1993 [DE] Germany ............... 43 27 616.4

[51] Int. Cl.$^6$ ................ C08G 63/80
[52] U.S. Cl. .......... 528/287; 528/308; 528/308.3; 528/308.5; 528/308.9; 528/308.8
[58] Field of Search ............... 528/287, 308.3, 528/308.5, 308.8, 309.1, 308

[56] References Cited

U.S. PATENT DOCUMENTS

| | | |
|---|---|---|
| 3,342,782 | 9/1967 | Barkey et al. |
| 3,853,819 | 12/1974 | Herwig ............ 528/287 |
| 3,941,752 | 3/1976 | Kleiner et al. |
| 4,191,715 | 3/1980 | Wu .................. 528/287 |
| 4,254,018 | 3/1981 | Kowallik ............ 528/287 |
| 5,151,494 | 9/1992 | Munday ............. 528/287 |

FOREIGN PATENT DOCUMENTS

| | | |
|---|---|---|
| 2193843 | 2/1974 | France. |
| 2243958 | 4/1975 | France. |
| 1495574 | 3/1969 | Germany. |

OTHER PUBLICATIONS

Freudenberger et. al., "Posphorhaltige Polyethylenterephthalate", Angewandte Makromolekulare Chemie, Bd. 105, 1982, pp. 203–215.

Primary Examiner—Patricia A. Short
Attorney, Agent, or Firm—Connolly & Hutz

[57] ABSTRACT

Described is a process for producing linear polyesters of improved whiteness and reduced yellowness by esterification of aromatic dicarboxylic acids or transesterification of their bis(lower alkyl) esters with or without aliphatic dicarboxylic acids with diols to form bisdiol esters and their oligomers and further condensation of these preproducts to spinnable polyesters, which comprises adding to the esterification, transesterification or polycondensation batch from 0.5 to 15% by weight of phosphorus-containing modifiers and conducting the polycondensation initially in the melt to an IV from 0.4 to 0.55 dl/g and thereafter in solid phase to an IV from 0.62 to 0.72, the indicated IV values being measured at 25° C. in dichloroacetic acid. The phosphorus-containing modifiers used preferably have the formula V or VI

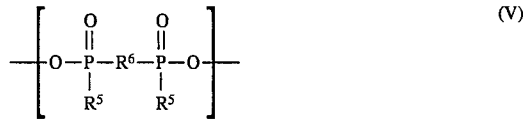

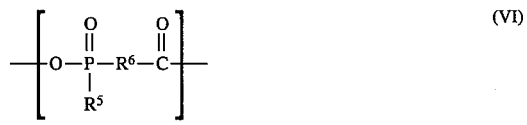

where $R^6$ is alkylene or polymethylene of 2 to 6 carbon atoms or phenyl and $R^5$ is alkyl of 1 to 6 carbon atoms, aryl or aralkyl, in the cocondensed state. Also described are the polyesters obtained by the process and fiber materials composed of these polyesters.

22 Claims, No Drawings

PRODUCTION OF POLYESTERS OF IMPROVED WHITENESS

The present invention relates to a process for producing linear polyesters of improved whiteness and reduced yellowness, which are suitable for producing fiber materials for textile use. The process of the invention, wherein the polycondensation is carried out in two stages, is particularly useful for producing modified polyester materials, for example low flammability polyesters, which, owing to the modifying constituents, tend to be more prone to yellowing.

Polyesters which are to be used for producing polyester fibers are produced by esterification of dicarboxylic acids with diols, initially forming the diesters of the dicarboxylic acids with the diols and their oligomers, and subsequent condensation of these preproducts to polyesters having the chain length necessary for spinning. The condensation, in the course of which the chain length goes to the value necessary for the production of fibers, is carried out at elevated temperature and is generally accompanied by a number of side reactions. The extent of side reaction depends on the choice of starting materials, on the choice of the esterification/transesterification catalysts and on the choice of modifying components possibly to be incorporated into the polyester chain. The side reactions give rise to products which, either during the condensation reaction or later in the course of the spinning process, cause yellowing of the polyester material and hence of the spun fibers.

In addition to the chosen starting materials and additives, the extent of the yellowing side reactions does of course also depend on the condensation conditions under which polyester formation is carried out. For unmodified polyester materials, especially polyethylene terephthalate, it has been possible in practice to find esterification and condensation conditions which will give polyesters sufficiently resistant to yellowing to be commercially useful. For modified polyesters, this goal has hitherto not been achieved in all cases. It has proved especially difficult to produce for example low flammability polyesters which contain phosphorus-containing compounds in the quality required and desired for textile applications as regards whiteness and yellowness. Usually, such modified polyesters, like the unmodified ones too, are produced by esterification of di-carboxylic acids and diols or transesterification of di(lower alkyl) dicarboxylates with diols and subsequent polycondensation to the chain length required for spinning, which is characterized by an intrinsic viscosity from about 0.6 to 0.75 dl/g. This polycondensation generally takes place after addition of a polycondensation catalyst in the melt at temperatures from 270° to 300° C. and a pressure down to 0.1 mbar.

The modification of polyester with phosphorus produces very good and permanent flame-resistant or self-extinguishing properties, but the customary melt polycondensation conditions mentioned raise the diglycol content of the polyester product and lower its melting point. It is further to be noted that the modification with phosphorus makes the hydrolyric, thermal and thermaloxidative degradation of the polyester chains more marked. This degradation becomes especially noticeable in the drying and spinning of the modified polyester. It leads to a reduction in the properties characteristic of polyester fibers, such as breaking strength, initial modulus and dyeability.

Moreover, as mentioned above, the presence of the modifier increases the extent to which, in the course of the polycondensation, there occur side reactions which have an adverse effect on the whiteness and yellowness but additionally also on the breaking strength. The yellow coloring is particularly noticeable as a disadvantage when thus modified polyesters are used in the form of ecru filaments and fibers.

The reduction in the mechanical strength and properties of the fiber material obtainable from the modified polyesters also entails increased textile processing faults, for example broken ends or nonuniformities in the drawing process.

The prior art approach is to combat the deterioration in the textile-mechanical data of the modified polyester fiber materials by keeping the polycondensation temperatures and spinning temperatures as low as possible and by drying the granule chips as gently as possible prior to spinning. The increased yellowing tendency of the polyester material is combated by adding optical brighteners. However, both measures have disadvantages. For instance, a lower condensation temperature lowers the reaction rate appreciably, so that longer condensation times become necessary, which is not only uneconomical but may also, again, promote the formation of undesirable by-products. The addition of optical brighteners is an additional measure which creates costs and, what is more, is not fully satisfactory either, since brighteners, as dyes in general, are subject to a process of light-induced degradation, as a result of which their effectiveness diminishes over time and it may even come to the formation of colored degradation products.

There is therefore an urgent need for a process for producing polyester materials for the production of textile fibers, which does not have the abovementioned disadvantages of the known process and which leads in particular to polyesters having higher whiteness and a reduced yellowness number.

It is already known from DE-A-1 495 574 to produce unmodified polyesters, in particular unmodified polyethylene terephthalate, having an average molecular weight of at least 14,000 to 50,000 and a corresponding intrinsic viscosity in a two-stage process whose first stage comprises a melt condensation to intrinsic viscosities from 0.33 to 0.45 and the polyester thus obtained is subsequently pulverized or pelletized and subjected to a solid state condensation. This process was used with preference for the production of polyesters used for the production of high tenacity industrial fibers and filaments.

It has now been found that a two-stage process as hitherto only ever used for producing unmodified polyesters, in particular those having a particularly high average molecular weight and a correspondingly high intrinsic viscosity, as utilized for the production of high tenacity industrial filaments and fibers, is very highly suitable for producing low flammability polyester materials for producing fibers for the textile use sector, i.e. with average molecular weights corresponding to intrinsic viscosities from about 0.6 to 0.75, which exhibit an appreciably improved whiteness and a reduced yellowness number.

The present invention accordingly provides a process for producing low flammability linear polyesters of improved whiteness and reduced yellowness by esterification of aromatic dicarboxylic acids or transesterification of their bis-(lower alkyl) esters with or without aliphatic dicarboxylic acids with diols to form bisdiol esters and their oligomers and further condensation of these preproducts to spinnable polyesters, which comprises adding to the esterification, transesterification or polycondensation batch from 0.5 to 15% by weight of phosphorus-containing modifiers and conducting the polycondensation initially in the melt to an intrinsic viscosity from 0.4 to 0.55 dl/g and thereafter in solid phase to an intrinsic viscosity from 0.6 to 0.75, preferably from 0.62 to 0.72.

The indicated values for the intrinsic viscosity are valid for the measurement being carried at 25° C. in dichloroacetic acid.

The splitting of the polycondensation step in the process of the invention into a part which is carried out in the melt and a part which is carried out in solid phase surprisingly results in an improvement in the whiteness and the lightness and also in a reduction in the yellowness number of the low flammability, modified polyester. In addition, fiber materials produced from the polyester produced according to the invention exhibit a distinct improvement in the textile-mechanical properties, presumably because the proportion of side reactions, in particular the degradation reaction of hydrolyric, thermal and thermal-oxidative degradation, is suppressed in the process of the invention.

The two-stage production process of the invention thus leads generally to an improvement in lightness and whiteness and to a reduction in the yellowness and is suitable in particular for producing polyesters which contain aromatic radicals in the polymer chain and are modified by the addition of phosphorus-containing modifiers. The phosphorus-containing modifier can, depending on its chemical structure, be present in the polyesters produced according to the invention as a physical mixing component or be incorporated in the chains of these modified polyesters. Its proportion of the polyester weight is advantageously from 0.5 to 15% by weight.

As for the rest, the polymer chains of the polyesters are composed of 0 to 100 mol % of building groups of the formula I

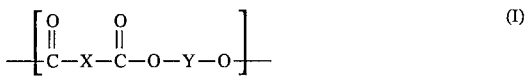

and 100 to 0 mol % of building groups of the formula II

wherein

X comprises more than 75 mol % of aromatic radicals having 5 to 16, preferably 6 to 12, carbon atoms and not more than 25 mol % of aliphatic radicals having 4 to 10 carbon atoms, preferably 6 to 8 carbon atoms, and Y comprises at least 85 mol % of alkylene or polymethylene groups having 2 to 4 carbon atoms and not more than 15 mol % of longer-chain polymethylene, alkylene groups or cycloalkylene groups, preferably having up to 8 carbon atoms, and also bivalent radicals derived from diglycol, triglycol or polyglycol.

Preferably polyesters which contain building groups of the formula II contain from 70 to 99 mol %, in particular from 85 to 95 mol %, of building groups of the formula I and from 1 to 30 mol %, in particular from 5 to 15 mol %, of building groups of the formula II.

Preference is given to producing polyesters in which X comprises at least 95 mol % of aromatic and not more than 5 mol % of aliphatic radicals, but in particular those in which X exclusively represents aromatic radicals.

Preferred aromatic radicals X are 1,4- and 1,3-phenylene, 1,4-, 1,5-, 1,8-, 2,6- and 2,7-naphthylene, 4,4'-biphenylylene, furylene and radicals of the formula III

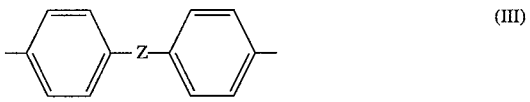

wherein

Z is polymethylene or alkylene having 1 to 4 carbon atoms, —SO$_2$—, —COO—, —O— or —S—.

The aromatic radicals may in turn carry one or two substituents, in which case, however, it is preferable that only a proportion of up to 15%, in particular of up to 7%, of the aromatic radicals present is substituted. Preferably the substituted aromatic radicals each carry only one substituent. Particularly suitable substituents are alkyl of 1 to 4 carbon atoms, alkoxy of 1 to 4 carbon atoms, chlorine and sulfo.

Radicals derived from aliphatic dicarboxylic acids and aromatic radicals which result in kinked chains, for example isophthalic radicals, or which contain relatively bulky aromatic nuclei, such as the naphthalene nucleus, and also the longer-chain building groups Y are incorporated into the polyester chain in particular when for example a modification of the mechanical properties or of the melt characteristics of the polyester is desired.

Preference is given to polyesters which contain less than 7% of these modifying components.

Examples of alkylene or polymethylene groups Y having 2 to 4 carbon atoms are ethylene, 1,3-propanediyl and 1,4-butanediyl. Longer-chain polymethylene groups Y include for example 3-ethylhexane-1,6-diyl and 1,8-octanediyl. A preferred cycloaliphatic building block Y is 1,4-bismethylenecyclohexane, derived from 1,4-bishydroxymethylcyclohexane.

A group of preferred polyesters have a polymer chain which, in addition to any phosphorus-containing modifying blocks built into the chain, exclusively contain building blocks of the formula IV

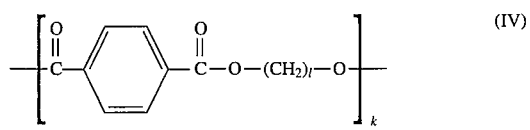

wherein 1 is from 2 to 6 and k is above 10.

It is of course also possible to prepare polyesters whose chain in addition to any incorporated phosphorus-containing building blocks contains only ethylene terephthalate groups and also phosphorus-modified polyesters which contain at least 85 mol %, preferably 95 mol %, of ethylene terephthalate units and up to 15 mol %, preferably up to 5 mol %, of dicarboxylic acid units and diol units which act as so-called modifiers, with advantage by the process of the invention.

A further preferred group of phosphorus-modified polyesters of aromatic dicarboxylic acids are those which conform to the abovementioned formulae, in particular phosphorus-modified polyethylene terephthalate which has been additionally modified by incorporation of up to 10 mol % of other building blocks from the abovementioned groups in such a way that certain performance characteristics are obtained, for example polyethylene terephthalate which through incorporation of sulfo-containing building blocks (e.g. sulfoisophthalic acid) has been given an affinity for basic dyes.

The process of the invention is particularly useful for producing the polyesters of the above-indicated structures which contain phosphorus-containing modifiers and as a result have been given flame-retardant and/or self-extinguishing properties, since this process makes it possible for the first time to produce these particularly useful polyesters in a simple manner in excellent visual quality combined with very good textile properties.

Preferably the esterification, transesterification or polycondensation batch has added to it a phosphorus-containing condensation-capable modifier which can be chemically incorporated into the polyester chain.

A particularly preferred group of polyesters produced by this preferred embodiment of the process of the invention are those which conform to the abovementioned formulae, in particular polyethylene terephthalate, which contain radicals of phosphinic acid derivatives, for example those of the formulae

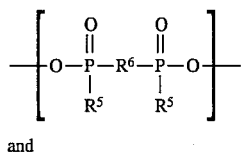

and

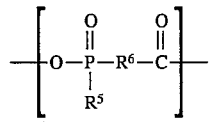

where $R^6$ is alkylene or polymethylene of 2 to 6 carbon atoms or phenyl and $R^5$ is alkyl of 1 to 6 carbon atoms, aryl or aralkyl, in cocondensed form.

Preferably, in the formulae V and VI, $R^6$ is ethylene and $R^5$ is methyl, ethyl, phenyl or o-, m- or p-methylphenyl, in particular methyl.

Advantageously the part of the polycondensation which is carried out in the melt is carried out at a temperature from 270° to 290° C., preferably from 275° to 285° C.

The second stage of the polycondensation, which is carried out in solid phase, is advantageously carried out at a temperature from 190° to 240° C., preferably from 205° to 225° C. The solid phase polycondensation can be carried out batchwise, for example in a tumble dryer, or else continuously in a tubular reactor. Advantageously the solid phase polycondensation is carried out under reduced pressure and/or under a protective gas.

It is particularly preferable to carry on the solid state condensation to an intrinsic viscosity of 0.65 to 0.69 dl/g.

The process of the invention can be used for producing matt or non-matt polyester material. To produce matt polyester, the polyester has added to and incorporated into it, during or after its production, from 1 to 2% by weight, preferably from 1.2 to 1.5% by weight, of a delusterant. Semi-matt polyesters are obtained by incorporating from 0.25 to 0.6, preferably from 0.3 to 0.5, % by weight of the delusterant. Generally, even polyesters without special matt effect, i.e. bright types, have small amounts of delusterants added to them. Thus, it is customary and also practicable in the process of the invention to incorporate into polyesters which are to be used for producing fibers without special matt effect up to 0.06% by weight, preferably up to 0.05% by weight, of a delusterant.

The delusterant used is preferably titanium dioxide.

In a further particularly preferred embodiment of the process according to the invention, the solid state condensation directly precedes the spinning of the polyester into fibers. The advantage of this embodiment is that the otherwise customary drying of the polyester before spinning can be saved and that, surprisingly, there is a significant reduction in the spinning faults compared with the conventional process.

The present invention further provides the polyesters obtained by the process of the invention with an intrinsic viscosity from 0.6 to 0.75 dl/g, preferably 0.62 to 0.72 dl/g, which are distinguished from conventionally produced ones by a whiteness above 85% and a yellowness number below 2.

Preferred polyesters produced according to the invention conform to the above-indicated formulae I, II and IV and the related definitions.

In particular, they contain at least 85 mol %, preferably at least 95 mol %, of ethylene terephthalate units and not more than 15 mol %, preferably up to 5 mol %, of dicarboxylic acid units and glycol units which act as so-called modifiers.

Particular preference is given to the low flammability and/or self-extinguishing polyesters of the above-indicated basic structures obtained by the process of the invention, which contain a phosphorus-containing modifier, preferably a phosphorus-containing modifier cocondensed into the polyester chain.

Particular preference is given to those which conform to the abovementioned formulae, in particular polyethylene terephthalate, which contain radicals of phosphinic acid derivatives, for example those of the formulae

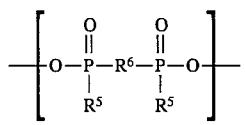

and

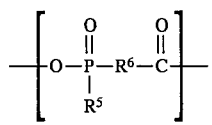

where $R^6$ is alkylene or polymethylene of 2 to 6 carbon atoms or phenyl and $R^5$ is alkyl of 1 to 6 carbon atoms, aryl or aralkyl, in cocondensed form.

Preferably, in the formulae V and VI, $R^6$ is ethylene and $R^5$ is methyl, ethyl, phenyl or o-, m- or p-methylphenyl, in particular methyl.

The phosphorus-containing modifier is customarily present in the polyester in an amount from 0.5 to 15% by weight, preferably from 1.5 to 6% by weight.

The polyesters of the invention may also contain up to 2% of delusterant. If the polyester is to be used for producing matt filaments and fibers, it customarily contains from 1 to 2, preferably from 1.2 to 1.5, % by weight of delusterant. To produce filaments and fibers having a less matt effect, it is customary to use polyesters containing from 0.25 to 0.6% by weight, preferably from 0.3 to 0.5% by weight, of delusterant, while non-matt fibers are produced using polyesters of the invention which contain only up to 0.06% by weight, preferably up to 0.05% by weight, of delusterant. Preferred delusterant for the polyesters produced by the process of the invention is titanium dioxide.

The present invention further provides polyester fiber material produced from the polyester produced by the process of the invention. Polyester fiber material for the purposes of the present invention includes continuous filament fibers in all compositions and processing states, for example in the form of continuous filament yarn, tow, random assembly or fiber web, and also further processing products produced therefrom, such as woven or knitted fabrics, or else staple fibers in all processing states, for example in the form of staple, web, spun yarn or secondary products produced therefrom such as woven and knitted fabrics.

The linear density of the fibers produced from the polyesters produced according to the invention ranges generally from 0.5 to 17 dtex, preferably from 0.6 to 5 dtex, in accordance with their preferred use in the textile sector.

The linear densities in the lower half of the indicated range, in particular from 0.5 to 1.2 dtex, are advantageously produced by high speed spinning processes whereby fully oriented filament yarns (FOYs) are obtainable directly. For this the process of the invention is run at high take-off speeds at which the air friction of the spun, moving filaments is sufficient to build up the drawing tension required for full orientation.

For specific applications, for example for the production of stiffening monofilaments, it is of course also possible to produce higher linear densities from the polyesters produced according to the invention. The fibers of the invention can be flat or crimped, and the crimp can have been brought about by all known texturing processes, for example by stuffer box crimping, the knit-deknit process or by false twist texturing. The fiber materials of the invention have round or multilobal polygonal or star-shaped cross sections. Preferably the fibers of the invention have a round cross section or a three-armedly star-shaped cross section.

Very good mechanical properties of the fibers according to the invention manifest themselves in a tenacity from 25 to 50 cN/tex, preferably from 30 to 45 cN/tex, a breaking extension from 15 to 50%, preferably from 20 to 45%, and a 200° C. dry heat shrinkage from 10 to 25%, preferably from 12 to 22%.

In combination with these good mechanical properties, the fibers produced according to the invention exhibit, although they have been rendered low flammable through the incorporation of phosphorus-containing polyester building blocks, a whiteness above 85%, preferably from 85 to 90%, and a yellowness number below 2, preferably from −2 to +2.

The intrinsic viscosity of the fiber material ranges from 0.60 to 0.66 dl/g, preferably from 0.62 to 0.64 dl/g.

The Examples which follow illustrate the practice of the two-stage polyester production process of the invention, the production of fiber materials from the polyesters produced by the process of the invention, and demonstrate the values determined on the resulting fiber materials as regards lightness, whiteness, yellowness and mechanical strength.

The subjective impression and the objectively determinable measurements for yellowness, lightness and whiteness depend on the yarn linear density and the filament linear density. The process of the invention shows its advantages especially at fine filament linear densities. The Examples were therefore carried out with a 76 dtex 64 filament yarn.

A particularly suitable way of producing these fine linear densities is the FOY process described by Tekaat in Chemiefaser/Textilindustrie 39/89 (1987) page 794 ff. However, the polyesters producible according to the invention can also be processed by the conventional spinning processes—production of a low orientation yarn (LOY) or of a partially oriented yarn (POY) + drawing, draw-texturing or draw-twisting—to give textile fiber materials.

The measurement of the Ganz whiteness, of the yellowness and of the lightness is carried out with an "Elrepho 2000" from Datacolor.

Using this instrument presupposes that the specimens presented to it for measurement ideally have a homogeneous, planar surface. To prepare the specimens, the yarns to be measured are wound in six layers planar onto a white support using a Zweigle winder, model V 701. The wound plaques were then measured using the Elrepho 2000.

The desired quantities of yellowness, lightness and whiteness are determined by the instrument and put out. Initially the reflectance factors $R_x$, $R_y$ and $R_z$ are measured according to DIN 53140.

The lightness is then defined as $R_y$.

The yellowness (number) is computed by the instrument according to the following formula:

$$\text{Yellowness} = 707.1 \left[ \frac{A \cdot X + B \cdot Z + 1}{A \cdot X + B \cdot Z + 1 + C \cdot Z} - V \right]$$

wherein $X=R_x/R_y$ and $Z=R_z/R_y$ and the constants A, B, C and V have the following values:

A=0.782, B=0.198, C=1.181, V=0.626.

Examples 1 and 2 show the production of a bright polyester fiber material, and Examples 3 and 4 that of a matt polyester fiber material.

EXAMPLE 1 single-stagedly, according to the prior art

A transesterification reactor was charged with 10 kg of dimethyl terephthalate, 6 kg of ethylene glycol and 3 g of manganese acetate×4 $H_2O$ and the mixture was heated to 140° C. with stirring under nitrogen as protective gas. The reaction temperature was raised over 4 hours to 205° C. and the eliminated methanol and the excess ethylene glycol were distilled off.

After the elimination of methanol had ended, the reaction mixture was admixed with 3.4 g of titanium dioxide (anatase) in the form of a glycolic suspension and 300 g of 2-methyl-2,5-dioxo-1-oxa-2-phospholane, which had been dissolved at 130° C. in 100 g of ethylene glycol, and the melt was additionally stirred for an hour at 205° to 230° C. to condense in the added phosphorus compound, to disperse the titanium dioxide homogeneously and to further distill off the excess ethylene glycol.

Subsequently the molten reaction product is transferred to a polycondensation vessel, admixed with 1.9 g of $H_3PO_3$ and 3.5 g of antimony trioxide, and stirred under nitrogen at 240° C. while ethylene glycol is distilled off under a slightly reduced pressure.

Then the internal pressure is reduced over an hour to 0.5 mbar while the temperature of the melt is raised from 240° to 280° C. Stirring is then continued at that temperature until the melt has an intrinsic viscosity, measured in dichloroacetic acid at 25° C., of 0.67 dl/g.

Then the melt is extruded into strands 4 mm in diameter and these strands are cut into chips 5 mm in length.

The polyester thus produced is dried in a dryer at 0.5 mbar and 160° C. for 10 hours before spinning. The dried polyester is then spun on a spinning apparatus according to the teaching of DE-A-2 117 659 into a 76 dtex 64 filament yarn. The melting was effected in an extruder at from 270° to 275° C. with a melt temperature of 175° C. and a melt pressure of 110 bar at the extruder outlet. The spinning kettle temperature was 280° C.

The spun filaments initially pass through a zone in which they are quenched with air to below the solidification point, then the filaments are heated back up to 190° C. and drawn against the air friction. Subsequently the filaments are provided with a 0.8% by weight spin finish add-on and taken off and wound up at a speed of 3800 m/min. The heater had a temperature of 190° C. and a length of 1200 mm.

The properties of the resulting drawn yarn are given in the table.

EXAMPLE 2 two-stagedly, according to the invention a) Melt condensation

Example 1 is repeated with a melt condensation to an intrinsic viscosity, measured in dichloroacetic acid at 25° C., of 0.51 dl/g.

Subsequently the melt is extruded into strands 4 mm in diameter and these strands are cut into chips 5 mm in length.

b) Solid state condensation 10 kg of the polyester chips produced in section a) are introduced into an evacuated 30 kg tumble dryer.

The chips are crystallized at 0.5 mbar and 140° C. for 10 minutes, during which they are continuously tumbled. On completion of the crystallization the tumble dryer is heated to 210° C. and the material is solid-state condensed at 0.5 mbar for 14 hours.

During this condensation phase samples were taken of the polyester chips and the increase in the intrinsic viscosity (IV) was determined. The following values were obtained:

After 8 h: IV=0.59 dl/g
After 10 h: IV=0.61 dl/g
After 12 h: IV=0.64 dl/g
After 14 h: IV=0.67 dl/g The polyester thus produced was—without additional drying—directly spun and drawn under exactly the same conditions as described in Example 1.

The properties of the resulting drawn yarn are given in the table.

EXAMPLE 3 single-stagedly according to the prior art

Example 1 was repeated with the addition, after the elimination of methanol had ended, of 130 g of titanium dioxide (anatase) in glycolic suspension.

The polyester thus produced was dried, spun and drawn under exactly the same conditions as described in Example 1.

The properties of the yarn obtained are given in the table.

EXAMPLE 4 two-stagedly, according to the invention a) Melt condensation

Example 2 was repeated with the addition, after the elimination of methanol had ended, of 130 g of titanium dioxide (anatase) in glycolic suspension.

b) Solid state condensation

Example 2 was repeated.

The polyester thus produced was—without additional drying—directly spun and drawn under exactly the same conditions as described in Example 1.

The properties of the resulting drawn yarn are given in the table.

TABLE

| Example | 1 | 2 | 3 | 4 |
|---|---|---|---|---|
| chips Intrinsic viscosity [dl/g] | 0.67 | 0.67 | 0.67 | 0.67 |
| Drawn yarn Intrinsic viscosity [dl/g] | 0.628 | 0.63 | 0.625 | 0.631 |
| Linear density [dtex] | 76 | 76 | 76 | 76 |
| Filament count | 64 | 64 | 64 | 64 |
| Amount of TiO₂ delusterant [% by weight] | 0.034 | 0.034 | 1.3 | 1.3 |
| Whiteness (according to Ganz) | 72.4 | 89.3 | 67.0 | 87 |
| Yellowness | 1.84 | 0.61 | 5.6 | 1.3 |
| Lightness | 79.4 | 80.3 | 88.3 | 89.1 |
| Tenacity [cN/tex] | 36.3 | 37.5 | 36.8 | 37.3 |
| Breaking extension [%] | 45.2 | 46.0 | 45.8 | 46.4 |
| Dry heat shrinkage 200° C. [%] | 12.5 | 12.4 | 12.6 | 12.7 |

What is claimed is:

1. A process for producing a linear, spinnable phosphorus-modified polyester having a whiteness above 85% and a yellowness number below 2, comprising:

esterifying an aromatic dicarboxylic acid or transesterifying an aromatic dicarboxylic acid bis(lower alkyl) ester with a diol to form a bisdiol ester or oligomeric preproduct, condensing a said preproduct to a linear, spinnable phosphorus-modified polyester in a plurality of steps comprising:

a. initially condensing a said preproduct in the melt to an IV from 0.4 to 0.55 dl/g, said IV being measured at 25° C. in dichloroacetic acid, and b. further condensing in solid phase to an IV from 0.62 to 0.72 dl/g, said IV being measured as in step a;

the resulting linear, spinnable phosphorus-modified polyester having a said whiteness value and a said yellowness number and being phosphorus-modified by adding, during said esterifying or transesterifying or condensing, 0.5 to 15% by weight of a phosphorus-containing modifier.

2. The process of claim 1, wherein the resulting polyesters contain at least 85 mol % of ethylene terephthalate units and not more than 15 mol % of dicarboxylic acid units and diol units which act as modifiers.

3. The process of claim 1, wherein the resulting polyesters contain at least 95 mol % of ethylene terephthalate units.

4. The process of claim 1, wherein the amount of phosphorus-containing modifiers added to the esterification, transesterification or polycondensation batch is from 1.5 to 6% by weight.

5. The process of claim 1, wherein a said phosphorus-containing modifier added to the esterification, transesterification or polycondensation batch is condensation-capable and has the formula V or VI

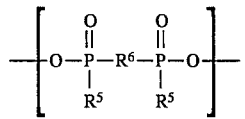

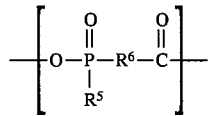

where $R^6$ is alkylene or polymethylene of 2 to 6 carbon atoms or phenyl and $R^5$ is alkyl of 1 to 6 carbon atoms, aryl or aralkyl.

6. The process of claim 5, wherein $R^6$ is ethylene and $R^5$ is methyl, ethyl, phenyl or o-, m- or p-methylphenyl.

7. The process of claim 1, wherein the melt polycondensation temperature ranges from 270° to 290° C.

8. The process of claim 1, wherein the solid phase polycondensation temperature ranges from 190° to 240° C.

9. The process of claim 1, wherein the solid phase polycondensation is carried out batchwise.

10. The process of claim 1, wherein the solid phase polycondensation is carried out continuously.

11. The process of claim 1, wherein the solid state of condensation is carried onto an IV from 0.65 to 0.69 dl/g.

12. The process of claim 1, further comprising incorporating a delusterant into the polyester.

13. The process of claim 12, wherein the delusterant used is $TiO_2$.

14. A polyester produced by the process of claim 1 with an IV from 0.62 to 0.72, the indicated IV values being measured at 25° C. in dichloroacetic acid, and containing a phosphorus-containing modifier, characterized by a whiteness above 85% and a yellowness number below 2.

15. The polyester of claim 14, containing at least 85 mol % of ethylene terephthalate units.

16. The polyester of claim 14, wherein the proportion of phosphorus-containing modifier ranges from 1.5 to 6% by weight.

17. The polyester of claim 14, further comprising a delusterant.

18. The polyester of claim 17, wherein the delusterant is TiO$_2$.

19. A polyester fiber material comprising the polyester of claim 14.

20. The polyester fiber material of claim 19, characterized by a whiteness from 85 to 90% and a yellowness number from −2 to +2.

21. The polyester fiber material of claim 19, wherein the polyester has an IV from 0.60 to 0.66 dl/g.

22. The polyester of claim 14, wherein a said phosphorus-containing modifier has been cocondensed into the polyester and has the formula V or VI

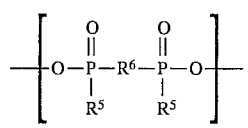
(V)

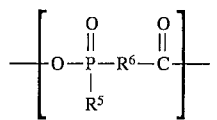
(VI)

where $R^6$ is alkylene or polymethylene of 2 to 6 carbon atoms or phenyl and $R^5$ is alkyl of 1 to 6 carbon atoms, aryl or aralkyl.

\* \* \* \* \*